United States Patent [19]
Welz et al.

[11] Patent Number: 5,630,979
[45] Date of Patent: May 20, 1997

[54] INSCRIPTION OF MOLDINGS

[75] Inventors: Martin Welz, Bad Dürkheim; Frank Prissok, Lemförde, both of Germany

[73] Assignee: Elastogran GmbH, Lemfoerde, Germany

[21] Appl. No.: 542,186

[22] Filed: Oct. 12, 1995

[30] Foreign Application Priority Data

Oct. 15, 1994 [DE] Germany ............ 44 36 897.6

[51] Int. Cl.$^6$ .................................. G03C 1/08
[52] U.S. Cl. .............. 264/400; 430/270.1; 430/346; 430/906; 430/945
[58] Field of Search ............ 264/400; 156/643; 219/121.61, 121.66, 121.67, 121.69; 430/346, 945, 947, 906, 269, 270.1

[56] References Cited

U.S. PATENT DOCUMENTS

| | | |
|---|---|---|
| 4,861,620 | 8/1989 | Azuma et al. . |
| 5,035,983 | 7/1991 | Kiyonari et al. . |
| 5,053,171 | 10/1991 | Portney et al. ............ 264/400 |
| 5,075,195 | 12/1991 | Babler et al. . |
| 5,207,955 | 5/1993 | Esrom et al. . |

FOREIGN PATENT DOCUMENTS

| | | |
|---|---|---|
| 327508 | 8/1989 | European Pat. Off. . |
| 345032 | 12/1989 | European Pat. Off. . |
| 400305 | 12/1990 | European Pat. Off. . |
| 542115 | 5/1993 | European Pat. Off. . |
| 2233334 | 1/1991 | United Kingdom . |

OTHER PUBLICATIONS

*Kunststoffe*, vol. 81, 1991, p. 4.
*Plast Verarbeiter*, vol. 38, Aug. 1987, pp. 64–65.

*Primary Examiner*—Mathieu D. Vargot
*Attorney, Agent, or Firm*—Keil & Weinkauf

[57] ABSTRACT

A process for the inscription of moldings based on thermoplastic polyurethane elastomers or mixtures of thermoplastic polyurethane elastomers with up to 45% by weight based on the total weight of polymers, of further thermoplastics, by means of high-energy radiation, wherein the additives employed to improve the inscribability include a copper phosphate and an inorganic phyllosilicate.

7 Claims, No Drawings

INSCRIPTION OF MOLDINGS

BACKGROUND OF THE INVENTION

1. Field of the Invention

The present invention relates to a process for the inscription of moldings based on polyurethane elastomers or mixtures of thermoplastic polyurethane elastomers with up to 45 % by weight, based on the total weight of polymers, of further thermoplastics, by means of high-energy radiation.

2. Description of Related Art

Plastics can be inscribed by printing processes. In recent years, however, laser inscription has become widely established. The advantages are that it is simple, fast and precise to carry out, is non-contact (no mechanical stresses or soiling of the workpiece), flexible (computer-controlled), clean and requires no chemicals. Laser equipment can easily be integrated into automatic production lines; finished plastic parts can be inscribed individually, since a layout change can be made simply and rapidly aided by computer. The inscription is carried out without contact, even in poorly accessible areas. There are thus considerable advantages over conventional printing methods.

The most important characteristic of the inscription produced is legibility, which can be quantified by means of the contrast. In addition to high contrast, an adequate depth of the change in color and a very smooth surface are required. The inscription should be abrasion-resistant and chemicals-resistant.

For a high-quality mark to be formed on a plastic molding, the absorption of laser light must cause a color-change reaction. Depending on the wavelength, incident intensity, pulse length, etc., different interactions between laser light and plastic dominate in each case, and a distinction is therefore made between a number of different laser-induced mechanisms which result in a durable mark: thermochemical reaction, carbonization of the surface, melting, remelting, evaporation, sublimation, engraving, discoloration, foaming, photochemical reaction, ablation (removal of material), bleaching of dyes, removal of a coating film.

In the case of laser inscription, a distinction is made between two processes; mask (projection) inscription and beam-deflection inscription (scanning of the laser beam). In mask inscription, pulsed lasers are used. A laser beam of sufficiently large aperture illuminates a mask carrying all the information to be transferred. By means of a lens, the mask is imaged on the surface to be inscribed; the information can be applied to the workpiece by means of a single laser pulse. In the case of large images, the mask can be scanned with a plurality of pulses. The maximum size of the inscription field is limited by the requisite energy density. The projection process thus allows rapid inscription; however, since a mask must be prepared, it is not so flexible. In the case of beam-deflection inscription, the laser beam is deflected onto the workpiece to be inscribed via two movable mirrors and a flat-field lens.

Predominant use has hitherto been made only of the $CO_2$ laser (wavelength 10.6 μm) and in particular the Nd:YAG laser (1.06 μm) or frequency-doubled Nd:YAG laser (532 nm). However, the absorption coefficient of the plastics to be treated is frequently not sufficiently high at these wavelengths to induce a color change in the polymeric material. For this reason, suitable auxiliaries and fillers which absorb strongly at the wavelength used and transfer the absorbed energy to the surrounding polymer matrix are usually added to the plastic during preparation thereof (for example addition of sensitizing colorants in the form of pigments, addition of toxic arsenic or cadmium compounds, addition of suitable monomers during copolymerization, coating of the substrate with specific paint and color films, inks, etc.). It is known to include carbon black or antimony trioxide in thermoplastic elastomers. Specific plastics additives having a high absorption capacity, in particular for the wavelength of the Nd:YAG laser, enable marks of high contrast, good contour sharpness and good abrasion resistance (C. Herkt-Maetzky, Kunststoffe 81 (1991) 4). Other processes use radiation-sensitive, bleachable additives (and possibly additional, less radiation-sensitive compounds which cannot be discolored). Irradiation then destroys the radiation-sensitive dyes, leaving the background or complementary color of the polymer matrix in the irradiated areas, forming a visual, colored contrast mark. Such color changes result in good contrast (EP 327508). Plastics which contain commercially available colored pigments can in some cases be inscribed using the frequency-doubled Nd:YAG laser, since many pigments and dyes absorb at 532 nm. The pigments are bleached, resulting in a color change. Addition of modified mica pigments allows the preparation of molding compositions which can be inscribed using the $CO_2$ laser (C. Herkt-Maetzky, Kunststoffe 81 (1991) 4). A process has also been described in which pigments are applied to a support material and are thermally melted into the surface using the laser (Plastverarbeiter 38 (1987) 64).

EP-A-400 305 describes highly polymeric materials containing copper(II) hydroxide phosphate as additive which can be inscribed using laser light.

Doping of plastics is complicated. The fillers added can have an adverse effect on the material properties of the plastic. For example, additives for improving the inscribability can frequently result in unintended side effects, such as reduced strength of the material or undesired colors on use of pigments. For this reason, specific laser-sensitive additives are desired which, when incorporated into the plastic, do not affect other applicational properties of the material. However, the sensitization is frequently only for a wavelength to which the system has been optimized.

It is an object of the present invention to provide a process for the inscription of moldings based on thermoplastics which does not have the above-described disadvantages and which enables the production of durable, high-contrast inscriptions in a technically simple manner.

SUMMARY OF THE INVENTION

We have found that durable, high-contrast inscriptions are produced in a simple manner on thermoplastic polyurethane elastomers by high-energy radiation where a copper phosphate and a coated or doped inorganic phyllosilicate have been added to the elastomer.

The high-energy radiation employed in the novel process generally has a wavelength in the range from 150 to 1500 nm, preferably in the range from 150 to 1100 nm.

Mention may be made here by way of example of $CO_2$ lasers (1060 nm) and Nd:YAG lasers (1064 or 532 nm) or pulsed UV lasers, where the latter are, in particular, excimer having the following wavelengths:

| | |
|---|---|
| $F_2$ excimer laser | 157 nm |
| ArF excimer laser | 193 nm |
| KrCl excimer laser | 222 nm |
| KrF excimer laser | 248 nm |
| XeCl excimer laser | 308 nm |
| XeF excimer laser | 351 nm | and frequency-multiplied Nd:YAG lasers having a wavelength of 355 nm (frequency-tripled) or 266 nm (frequency-quadrupled).

Particular preference is given to Nd:YAG lasers (1064 or 532 nm), KrF lasers (248 nm) and XeCl lasers (308 nm).

The energy densities of the lasers employed are generally in the range from 0.3 mJ/cm² to 50 J/cm², preferably from 0.5 mJ/cm² to 20 J/cm², particularly preferably from 1 mJ/cm² to 10 J/cm².

When pulsed lasers are used, the pulse frequency is generally in the range from 0.1 to 10,000 Hz, preferably from 0.5 to 5000 Hz, in particular from 1 to 1000 Hz, and the pulse length (duration of the individual pulses) is in the range from 0.1 to 1000 ns, preferably from 0.5 to 500 ns, particularly preferably from 1 to 100 ns.

Depending on the energy density of the laser used, the pulse lengths and the type of irradiated molding, from 1 to 20,000, preferably from 1 to 5000, in particular from 1 to 3000 pulses are generally sufficient to achieve good inscriptions.

Corresponding lasers which can be employed in the novel process are commercially available.

Excimer lasers are particularly suitable for the projection (mask) process. However, it is also possible to guide the beam using movable mirrors (scanning). Given a homogeneous beam cross section, it is possible to irradiate a mask measuring approximately 2 cm×2 cm. However, use of suitable optical systems allows the beam cross section to be expanded further.

Excimer lasers allow good inscription using only one pulse (given a suitable energy density), so that, in contrast to Nd:YAG lasers, inscriptions can also be carried out very rapidly. In the mass production of injection moldings, for example, the inscription time must be less than the injection-molding time (<approx. 30 s) divided by the number of mold cavities. Consequently, the injection moldings must in these cases be inscribed at high rates. Such high rates are sometimes impossible with the Nd:YAG laser and only achievable with a 1-pulse mask bombardment.

Even greater demands of the inscription rate are made by continuous processes, for example profile extrusion with material, rates of several m/s. Even the high writing speeds of Nd:YAG lasers are no longer sufficient for this purpose.

Other radiation sources which can be used are continuous UV lamps, such as Hg, Xe or deuterium lamps. These products are likewise commercially available.

The novel process is used for the inscription of moldings based on thermoplastic polyurethane elastomers or mixtures of thermoplastic polyurethane elastomers with up to 45%, based on the total polymer content, of other polymers.

Thermoplastic polyurethane elastomers (referred to below as "TPUs") generally comprise a soft phase of relatively high-molecular-weight polyhydroxyl compounds, for example polyester or polyether segments, and a hard phase of urethane groups, formed from low-molecular-weight chain extenders and polyisocyanates. Analogously, polyetheramides contain a polyether soft phase and a polyamide hard phase.

TPUs are usually prepared by reacting a pre-prepared, relatively high-molecular-weight, essentially linear polyhydroxyl compound with an organic diisocyanate and a low-molecular-weight chain extender by the one-shot or prepolymer process in a suitable apparatus. Depending on the chemical structure and reactivity of the starting materials used, the reaction temperature used and the reaction rate, which is dependent thereon, TPUs with a certain degree of blockwise bonding of the soft and hard segments can be obtained. A well-formed block structure results, inter alia, in high elasticity in TPUs. If the block structure is adversely affected, for example by excessively high reaction temperatures or excessive reaction times, this results in a deterioration in the mechanical properties of the TPU.

Preferred TPUs can be prepared, for example, by reacting
a) organic, preferably aromatic diisocyanates, in particular 4,4'-diphenylmethane diisocyanate, with
b) at least one relatively high-molecular-weight polyhydroxyl compound, preferably an essentially difunctional polyhydroxyl compound having a molecular weight of from 500 to 8000, in particular polyalkylene glycol polyadipates having 2 to 6 carbon atoms in the alkylene radical and having molecular weights of from 500 to 6000, or polyoxytetramethylene glycol having a molecular weight of from 500 to 3200, and
c) at least one low-molecular-weight chain extender, expediently having a molecular weight of less than 400, preferably from
60 to 300, in particular 1,4-butanediol,
in the absence or preferably in the presence of
d) catalysts and, if desired,
e) additives
at elevated temperatures.

The following details apply to the TPU formative components (a) to (c) and, if used, (d) and/or (e):

a) Suitable organic diisocyanates (a) are, for example, aliphatic, cycloaliphatic and preferably aromatic diisocyanates. Specific examples which may be mentioned are: aliphatic diisocyanates, such as hexamethylene 1,6-diisocyanate, 2-methylpentamethylene 1,5-diisocyanate, 2-ethyl-2-butylpentamethylene 1,5-diisocyanate, 2-ethylbutylene 1,4-diisocyanate or mixtures of at least two of said aliphatic diisocyanates, cycloaliphatic diisocyanates, such as isophorone diisocyanate, 1,4-cyclohexane diisocyanate, 1-methyl-2,4- and -2,6-cyclohexane diisocyanate and the corresponding isomer mixtures, 4,4'-, 2,4'- and 2,2'-dicyclohexylmethane diisocyanate and the corresponding isomer mixtures, and preferably aromatic diisocyanates, such as 2,4-tolylene diisocyanate, mixtures of 2,4- and 2,6-tolylene diisocyanate, 4,4'-, 2,4'- and 2,2'-diphenylmethane diisocyanate, mixtures of 2,4'- and 4,4'-diphenylmethane diisocyanate, urethane-modified, liquid 4,4'- and/or 2,4'-diphenylmethane diisocyanates, 4,4'-diisocyanato-1,2-diphenylethane and mixtures of 4,4'-, 2,4'- and 2,2'-diisocyanato-1,2-diphenylethane, advantageously those having a 4,4'-diisocyanato-1,2-diphenylethane content of at least 95% by weight. Preference is given to diphenylmethane diisocyanate isomer mixtures having a 4,4'-diphenylmethane diisocyanate content greater than 96% by weight and in particular essentially pure 4,4'-diphenylmethane diisocyanate.

The organic diisocyanates may, if desired, be replaced in minor amounts, for example in amounts of up to 3 mol %, preferably up to 1 mol %, based on the organic diisocyanate, by a trifunctional or higher-functional polyisocyanate, but the amounts thereof must be limited so that thermoplastically processable polyurethanes are still obtained. A larger amount of more than difunctional isocyanates of this type is expediently compensated by the presence of less than difunctional compounds containing reactive hydrogen atoms, so that excessive chemical cross-linking of the polyurethane is avoided. Examples of more than difunctional isocyanates are mixtures of diphenylmethane diisocyanates and polyphenylpolymethylene polyisocyanates, known as crude MDI, and liquid 4,4'- and/or 2,4'-diphenylmethane diisocyanates which have been modified by isocyanurate, urea, biuret, allophanate, urethane and/or carbodiimide groups.

Examples which may be mentioned of suitable monofunctional compounds containing a reactive hydrogen atom which can be used as molecular weight regulators are: monoamines, for example butylamine, dibutylamine, octylamine, stearylamine, N-methylstearylamine, pyrrolidone, piperidine and cyclohexylamine, and monoalcohols, for example butanol, amyl alcohol, 1-ethylhexanol, octanol, dodecanol, cyclohexanol and ethylene glycol monoethyl ether.

b) Suitable relatively high-molecular-weight polyhydroxyl compounds (b) having molecular weights of from 500 to 8000 are preferably polyether-ols and in particular polyester-ols. Also suitable, however, are other hydroxyl-containing polymers containing ether or ester groups as bridging members, for example polyacetals, such as polyoxymethylenes and in particular water-insoluble formals, for example polybutanediol formal and polyhexanediol formal, and polycarbonates, in particular those prepared from diphenyl carbonate and 1,6-hexanediol by transesterification. The polyhydroxyl compounds must be at least predominantly linear, i.e. having a difunctional structure for the purposes of the isocyanate reaction. Said polyhydroxyl compounds can be used as individual components or in the form of mixtures.

Suitable polyether-ols can be prepared by known processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropyl-oxide, as catalysts and with addition of at least one initiator molecule preferably containing 2 bonded reactive hydrogen atoms, or by cationic polymerization using Lewis acids, such as antimony pentachloride, boron fluoride etherate, inter alia, or bleaching earth as catalysts, from one or more alkylene oxides having 2 to 4 carbon atoms in the alkylene radical.

Examples of suitable alkylene oxides are 1,3-propylene oxide, 1,2- and 2,3-butylene oxide and preferably tetrahydrofuran, ethylene oxide and 1,2-propylene oxide. The alkylene oxides can be used individually, alternately one after the other or as mixtures. Examples of suitable initiator molecules are: water, organic dicarboxylic acids, such as succinic acid, adipic acid and/or glutaric acid, N-alkyldialkanolamines, for example N-methyl- and N-ethyldiethanolamine, and preferably dihydric alcohols, which may contain bonded ether bridges, for example ethanediol, 1,2- and 1,3-propanediol, 1,4-butanediol, diethylene glycol, 1,5-pentanediol, 1,6-hexanediol, dipropylene glycol, 2-methyl-1,5-pentanediol and 2-ethyl-1,4-butanediol. The initiator molecules can be employed individually or as mixtures.

Preference is given to polyether-ols made from 1,2-propylene oxide and ethylene oxide in which more than 50%, preferably from 60 to 80%, of the OH groups are primary hydroxyl groups and in which at least some of the ethylene oxide is arranged as a terminal block. Polyether-ols of this type can be obtained by, for example, first polymerizing the 1,2-propylene oxide and subsequently the ethylene oxide onto the initiator molecule or first copolymerizing all the 1,2-propylene oxide mixed with some of the ethylene oxide and subsequently polymerizing on the remainder of the ethylene oxide, or in a stepwise manner first polymerizing some of the ethylene oxide, then all the 1,2-propylene oxide and then the remainder of the ethylene oxide onto the initiator molecule.

Very highly suitable are in particular the hydroxyl-containing polymerization products of tetrahydrofuran, the polyoxytetramethylene glycols.

The essentially linear polyether-ols have molecular weights of from 500 to 8000, preferably from 600 to 6000, in particular from 800 to 3500, the polyoxytetramethylene glycols preferably having molecular weights of from 500 to 3200, in particular from 600 to 2200. The polyether-ols can be used individually or in the form of mixtures with one another.

Suitable polyester-ols can be prepared, for example, from dicarboxylic acids having 2 to 12, preferably 4 to 6, carbon atoms and polyhydric alcohols. Examples of suitable dicarboxylic acids are: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, for example in the form of a mixture of succinic, glutaric and adipic acids. It may be advantageous, for the preparation of the polyester-ols, to replace the dicarboxylic acids by the corresponding dicarboxylic acid derivatives, such as dicarboxylic monoesters and/or diesters having 1 to 4 carbon atoms in the alcohol radical, dicarboxylic anhydrides or dicarboxylic acid dichlorides. Examples of polyhydric alcohols are alkanediols having 2 to 10, preferably 2 to 6, carbon atoms, such as ethanediol, 1,3-propanediol, 1,4-butanediol, 1,5-pentanediol, 1,6-hexanediol, 1,10-decanediol, 2,2-dimethyl-1,3-propanediol, 1,2-propanediol and dialkylene glycols, such as diethylene glycol and dipropylene glycol. Depending on the desired properties, the polyhydric alcohols can be used alone or, if desired, in mixtures with one another.

Also suitable are polyesters of carbonic acid with said polyhydric alcohols, in particular alkanediols having 4 to 6 carbon atoms, such as 1,4-butanediol and/or 1,6-hexanediol, products of the condensation of ω-hydroxycarboxylic acids, for example ω-hydroxycaproic acid, and preferably products of the polymerization of lactones, for example substituted or unsubstituted ω-caprolactones.

Preferred polyester-ols are polyalkylene glycol polyadipates having 2 to 6 carbon atoms in the alkylene radical, for example ethanediol polyadipates, 1,4-butanediol polyadipates, ethanediol 1,4-butanediol polyadipates, 1,6-hexanediol neopentyl glycol polyadipates, 1,6-hexanediol 1,4-butanediol polyadipates and polycaprolactones.

The polyester-ols have molecular weights of from 500 to 6000, preferably from 800 to 3500.

c) Suitable chain extenders (c) having molecular weights of less than 400, preferably from 60 to 300, are preferably alkanediols having 2 to 12 carbon atoms, preferably having 2, 4 or 6 carbon atoms, and/or alkylene glycols, for example ethanediol, 1,6-hexanediol, diethylene glycol, dipropylene glycol and in particular 1,4-butanediol. Also suitable, however, are diesters of terephthalic acid with glycols having 2 to 4 carbon atoms, for example terephthalic acid bis(ethylene glycol) or bis(1,4-butanediol), and hydroxyalkylene ethers of hydroquinone, for example 1,4-di(β-hydroxyethyl)hydroquinone, and polytetramethylene glycols having molecular weights of from 162 to 378.

In order to adjust the hardness and melt flow index, the formative components can be varied within relatively broad molar ratios, the hardness and melt viscosity increasing and the melt flow index decreasing with increasing content of chain extenders (c).

In order to prepare relatively soft TPUs, for example having a Shore A hardness of less than 95, preferably from 95 to 75, the essentially difunctional polyhydroxyl compounds (b) and the alkanediols (c) can advantageously be used, for example, in a molar ratio of from 1:1 to 1:5, preferably from 1:1.5 to 1:4.5, so that the resultant mixtures of (b) and (c) have a hydroxyl equivalent weight of greater than 200, in particular of from 230 to 450; on the other hand, in order to prepare relatively hard TPUs, for example having a Shore A hardness of greater than 98, preferably a Shore D hardness of from 55 to 75, the (b):(c) molar ratio is in the range from 1:5.5 to 1:15, preferably from 1:6 to 1:12, so that the resultant mixtures of (b) and (c) have a hydroxyl equivalent weight of from 110 to 200, preferably from 120 to 180.

The TPUs can be prepared in the absence or preferably in the presence of catalysts (d). Suitable catalysts which accelerate, in particular, the reaction between the NCO groups of the diisocyanates (a) and the hydroxyl groups of formative components (b) and (c) are the customary tertiary amines known from the prior art, for example triethylamine, dimethylcyclohexylamine, N-methylmorpholine, N,N'-dimethyl-piperazine, diazabicyclo[2.2.21]octane and the like and in particular organometallic compounds, such as titanic esters, iron compounds, tin compounds, for example tin diacetate, tin dioctanoate, tin dilaurate or the dialkyltin salts of aliphatic carboxylic acids, such as dibutyltin diacetate, dibutyltin dilaurate or the like. The catalysts are usually employed in amounts of from 0.001 to 0.1 part by weight per 100 parts by weight of the mixture of polyhydroxyl compounds (b) and chain extenders (c).

In addition to catalysts (d), additives (e) may also be incorporated into the formative components. Examples which may be mentioned are lubricants, inhibitors, hydrolysis, light, heat and discoloration stabilizers, flame-proofing agents, dyes, pigments, inorganic and/or organic fillers and reinforcing materials.

To this end, the additives (e) can be introduced into the formative components or into the reaction mixture for the preparation of the TPUs.

If no further details are given below on the auxiliaries or additives which can be used, these can be obtained from the specialist literature, for example the monograph by J. H. Saunders and K. C. Frisch, "High Polymers", Volume XVI, Polyurethane, part 1 and 2 (Interscience Publishers, 1962 and 1964 respectively), the Kunststoff-Handbuch, Volume 7, Polyurethane, 1st and 2nd Edition (Carl Hanser Verlag, 1966 and 1983 respectively) or DE-A 29 01 774.

In order to prepare the TPUs, formative components (a), (b) and (c) are reacted, preferably in the presence of catalysts (d) and, if desired, additives (e), generally in such amounts that the ratio between the number of equivalents of NCO groups of the diisocyanates and the total number of hydroxyl groups of components (b) and (c) is from 0.90 to 1.20:1, preferably from 0.99 to 1.07;1, in particular from 1.00:1 to 1.05:1.

The TPUs can be prepared, for example, by the extruder or preferably belt process by batchwise or continuous mixing of formative components (a) to (c) and, if used, (d) and/or (e), allowing the reaction mixture to react to completion in the extruder or on a support belt at from 60° to 250° C., preferably at from 70° to 150° C., and subsequently granulating the resultant TPUs. It may be expedient to condition the resultant TPU at from 80° to 120° C., preferably at from 100° to 110° C., for from 1 to 24 hours before further conversion.

As stated above, the TPUs are preferably prepared by the belt process. To this end, formative components (a) to (c) and, if used, (d) and/or (e) are mixed continuously at above the melting point of (a) to (c) with the aid of a mixer head. The reaction mixture is applied to a support, preferably a conveyor belt, for example made of metal, and passed through a temperature-controlled zone with a length of from 1 to 20 meters, preferably from 3 to 10 meters, with a speed of from 1 to 20 m/minute, preferably from 4 to 10 m/minute. The reaction temperature in this zone is from 60° to 200° C., preferably from 80° to 180° C. Depending on the diisocyanate content in the reaction mixture, the reaction is controlled by cooling or heating in such a way that at least 70%, preferably at least 80%, of the isocyanate groups of the diisocyanates are reacted, and the reaction mixture is solidified at the selected reaction temperature. The free isocyanate groups in the solidified reaction product give TPUs having a relatively low melt viscosity or a high melt flow index.

The TPUs can also be in the form of a mixture with other polymers, where the proportion by weight of the other polymers can be up to 45% by weight, preferably up to 35% by weight, based on the total weight of polymers.

Particularly suitable polymers here are those which, when mixed with TPU, allow the properties of the mixture to be varied in order to establish a certain property profile in a targeted manner. Corresponding polymers and their mixtures with TPU are known per se to the person skilled in the art and are described in the literature, rendering further details superfluous.

In order to improve the inscribability, additives which increase the absorption at the laser wavelength used can be added to the molding compositions employed for the production of the moldings to be inscribed in accordance with the invention. Particular mention should be made here of UV absorbers.

As additives for improving the inscribability, the moldings to be inscribed by the novel process contain a copper phosphate, in particular a copper(II) hydroxide phosphate.

Particular preference is given to a product having the empirical chemical formula $4CuO \cdot P_2O_5 \cdot H_2O$ or $Cu_3(PO_4)_2 \cdot Cu(OH)_2$ formed by heating blue copper(II) orthophosphate $(Cu_3(PO_4)_2 \cdot 3 H_2O)$ to from 100° to 200° C. This product is a greenish crystal powder.

Other suitable copper phosphates are $6CuO \cdot P_2O_5 \cdot 3H_2O$, $Cu_3(PO_4)_2 \cdot 3Cu(OH)_2$, $5CuO \cdot P_2O_5 \cdot 3H_2O$, $Cu_3(PO_4)_2 \cdot 2Cu(OH)_2 \cdot H_2O$, $4CuO \cdot P_2O_5 4CuO \cdot P_2O_5 \cdot 3H_2O$, $4CuO \cdot P_2O_5 \cdot 1.5H_2O$ and $4CuO \cdot P_2O_5 \cdot 1.2H_2O$.

The amount of copper phosphate is not subject to any particular limitation but is generally in the range from 0.02 to 5% by weight, preferably from 0.05 to 0.5% by weight, in particular from 0.05 to 0.18% by weight, based on the total weight of polymer.

It has proven technically advantageous here to add the additive in the form of a concentrate in thermoplastic polyurethane, preferably polyether polyurethane, which contains from 5 to 80% by weight, preferably from 10 to 75% by weight, of copper(II) phosphate. The concentrate can be prepared in conventional plastics-processing machines, preferably compounders or twin-screw extruders.

In a preferred embodiment, an inorganic phyllosilicate is added in addition to the copper phosphate, producing, overall, a synergistic effect. Suitable phyllosilicates are mica, talc, glass, kaolin and $SiO_2$ flakes, or mixtures thereof.

Preference is given to ground mica having a particle size of less than 500 µm, in particular less than 100 µm. Particular preference is given to mica with a coating of $TiO_2$, $SiO_2$, $SnO_2$ or conductively doped compounds on a silicate core.

The copper phosphate:phyllosilicate mixing ratio is not subject to any particular restriction and is generally from 10:90 to 90:10, preferably from 70:30 to 30:70.

The phyllosilicate is preferably added together with the phosphate via the abovementioned concentrate, but separate addition is in principle also possible.

Besides copper phosphates and, if desired, mica, further additives usually employed for the inscription of moldings with lasers can also be used, but the addition of further additives is not necessary.

EXAMPLES

EXAMPLE 1

White injection moldings were produced from a thermoplastic polyether-polyurethane having a Shore A hardness of 90, based on 1000 parts of polytetrahydrofuran having a molecular weight of 1000, 700 parts of MDI and 162 parts of 1,4-butanediol. The moldings also contained 1% of $TiO_2$, 0.1% of $CU_3(PO_4)_2 \cdot Cu(OH)_2$ and 0.15% of mica. The additives were added before the molding operation in the form of concentrates in polyether-TPU. The inscription was carried out using an Nd:YAG laser at a wavelength of 1064 nm, a lamp current of 15 amperes, a pulse frequency of 4 kHz and a writing speed of 500 mm/sec.

EXAMPLE 2

The procedure was as for Example 1, but with 0.2% of $Cu_3(PO_4)_2 \cdot Cu(OH)_2$ and 0.2% of mica coated with tin oxide.

EXAMPLE 3

The procedure was as for Example 1, but with 0.15% of $Cu_3(PO_4)_2 \cdot Cu(OH)_2$.

EXAMPLE 4

The procedure was as for Example 1, but with 0.15% of $Cu_3(PO_4)_2 \cdot Cu(OH)_2$ and 0.2% of mica coated with tin oxide.

EXAMPLE 5

The procedure was as for Example 1, but with 0.2% of $Cu_3(PO_4)_2 \cdot 3 Cu(OH)_2$ and 0.2% of mica coated with tin oxide.

EXAMPLE 6

The procedure was as for Example 1, but with 0.2% of $4 CuO \cdot P_2O_5 \cdot 1.5 H_2O$ and 0.2% of mica coated with tin oxide.

EXAMPLE 7

Yellow injection moldings were produced from a thermoplastic polyether-polyurethane having a Shore A hardness of 85, based on 1000 parts of polytetrahydrofuran having a molecular weight of 1000, 600 parts of MDI and 126 parts of 1,4-butanediol. The moldings also contained 0.6% of titanium dioxide and 0.25% of quinophthalone yellow (Paliotol K 0961). 0.18% of $Cu_3(PO_4)_2 \cdot Cu(OH)_2$ and 0.15% of mica (<100 μm) were used as additives (laser absorbers).

EXAMPLE 8

White injection moldings containing 1% of titanium dioxide were produced from a polyester-polyurethane having a Shore A hardness of 90, based on 1000 parts of poly(butyl hexyl adipate) having a molecular weight of 2000, 580 parts of MDI and 162 parts of 1,4-butanediol. 0.15% of $Cu_3(PO_4)_2 \cdot Cu(OH)_2$ and 0.5% of mica were used as laser absorbers.

EXAMPLE 9

The procedure was as for Example 1, but the inscription was carried out using an Xef excimer laser at a wavelength of 351 nm at 30 pulses/sec. and an energy density of 300 mJ/cm$^2$.

EXAMPLE 10

White extrudates were produced from a blend of 89% of a thermoplastic polyether-polyurethane having a Shore A hardness of 85, based on 1000 parts of polytetrahydrofuran having a molecular weight of 1000, 600 parts of MDI and 126 parts of 1,4-butanediol, 10 % of a high-impact polystyrene and 1% of titanium dioxide. 0.2% of $Cu_3(PO_4)_2 \cdot Cu(OH)_2$ and 0.2% of coated mica were used as laser absorbers. The inscription was carried out using an Nd:YAG laser at 1064 nm, a current strength of 19 amperes, a pulse frequency of 5 kHz and a writing speed of 600 m/sec.

COMPARATIVE EXAMPLE 1

The procedure was as for Example 1, but without additional laser absorbers.

COMPARATIVE EXAMPLE 2

The procedure was as for Example 1, but with 5% of antimony trioxide as laser absorber (prior art).

TABLE

| Example | Reflection background | Reflection inscription | Foaming | Contrast | Edge sharpness | Overall assessment | Bar code legible |
|---|---|---|---|---|---|---|---|
| 1 | 81% | 33% | no | 3 | 3 | 3 | yes |
| 2 | 77% | 26% | no | 2 | 2 | 2 | yes |
| 3 | 75% | 36% | no | 4 | 3 | 3 | yes |
| 4 | 62% | 19% | no | 1 | 1 | 1 | yes |
| 5 | 71% | 29% | virtually none | 3 | 2 | 2 | yes |
| 6 | 77% | 31% | virtually none | 3 | 2 | 2 | yes |
| 7 | 71% | 30% | no | 3 | 3 | 3 | yes |
| 8 | 64% | 21% | virtually none | 3 | 2 | 2 | yes |
| 9 | 81% | 18% | no | 1 | 1 | 1 | yes |
| 10 | 77% | 25% | no | 2 | 3 | 2 | yes |
| Comparison 1 | 70% | none | inscription possible | — | | 6 | no |
| Comparison 2 | 45% | 14% | virtually none | 4 | 3 | 3 | yes |

Assessment scale: 1 = very good; 6 = very poor

We claim:

1. A process for the inscription of moldings based on thermoplastic polyurethane elastomers or mixtures of thermoplastic polyurethane elastomers with up to 45% by weight, based on the total weight of polymers, of further thermoplastics, which process comprises: exposing a mixture of thermoplastics and additives for improving the inscribability of the thermoplastics to high-energy radiation, said additives being a copper phosphate mixed with an inorganic phyllosilicate coated with $TiO_2$, $SiO_2$ or $S_nO_2$ or a copper phosphate mixed with a conductively doped compound on a silicate core.

2. A process as defined in claim 1, wherein the high-energy radiation source used is a pulsed UV laser or an Nd:YAG laser.

3. A process as defined in claim 1, wherein the high-energy radiation source used is a continuous UV lamp.

4. An inscribed molding produced by a process as defined in claim 1.

5. The process of claim 1, wherein the inorganic phyllosilicate is mica.

6. The process of claim 1, wherein the inorganic phyllosilicate is mica coated with tin oxide.

7. The process of claim 1, wherein the copper phosphate is $Cu_3(PO_4)_2 \cdot Cu(OH)_2$ and wherein the inorganic phyllosilicate is mica coated with tin oxide.

* * * * *